(12) United States Patent
Fallon et al.

(10) Patent No.: US 12,219,987 B2
(45) Date of Patent: Feb. 11, 2025

(54) SEPARATOR DRUM

(71) Applicant: Nicoventures Trading Limited, London (GB)

(72) Inventors: Gary Fallon, London (GB); Gerhard Le Roux, London (GB)

(73) Assignee: NICOVENTURES TRADING LIMITED, London (GB)

( * ) Notice: Subject to any disclaimer, the term of this patent is extended or adjusted under 35 U.S.C. 154(b) by 79 days.

(21) Appl. No.: 16/965,787

(22) PCT Filed: Jan. 30, 2019

(86) PCT No.: PCT/GB2019/050253
§ 371 (c)(1),
(2) Date: Jul. 29, 2020

(87) PCT Pub. No.: WO2019/150103
PCT Pub. Date: Aug. 8, 2019

(65) Prior Publication Data
US 2021/0045431 A1    Feb. 18, 2021

(30) Foreign Application Priority Data
Jan. 30, 2018   (GB) ..................................... 1801515

(51) Int. Cl.
*A24C 5/32*   (2006.01)
*A24C 5/01*   (2020.01)
(Continued)

(52) U.S. Cl.
CPC ................. *A24C 5/327* (2013.01); *A24C 5/01* (2020.01); *A24C 5/10* (2013.01); *A24C 5/12* (2013.01);
(Continued)

(58) Field of Classification Search
CPC .......... A24C 5/478; A24C 5/327; A24C 5/326; A24C 5/3418; A24C 5/12; A24C 5/607
See application file for complete search history.

(56) References Cited

U.S. PATENT DOCUMENTS

2015/0329306 A1* 11/2015 Ing ........................ A24C 5/473
226/97.4

FOREIGN PATENT DOCUMENTS

DE      102013009676 A1    12/2014
EP      2335503 A1          6/2011
(Continued)

OTHER PUBLICATIONS

Machine Translation EP2363029A1 to Pawleko. Espacenet, accessed May 17, 2022. Relied upon for citations. (Year: 2011).*
(Continued)

*Primary Examiner* — Michael H. Wilson
*Assistant Examiner* — Stephanie Lynn Moore
(74) *Attorney, Agent, or Firm* — CANTOR COLBURN LLP

(57) ABSTRACT

There is disclosed a separator drum (13) for tobacco industry product assembly apparatus. The separator drum has a plurality of segments (29, 30) arranged to form at least a part of a peripheral surface of the separator drum. Each segment has at least one flute (31) and at most four flutes (31). Each flute (31) is adapted to carry a rod of aerosolisable material (2) as the separator drum rotates during use. Each segment (29, 30) is slidably mounted to the separator drum (13) for axial movement.

16 Claims, 8 Drawing Sheets

(51) Int. Cl.
    *A24C 5/10*     (2006.01)
    *A24C 5/12*     (2006.01)
    *A24C 5/47*     (2006.01)
    *B65G 47/82*     (2006.01)
    *B65G 47/84*     (2006.01)

(52) U.S. Cl.
    CPC .............. *A24C 5/478* (2013.01); *B65G 47/82* (2013.01); *B65G 47/848* (2013.01); *B65G 2201/0226* (2013.01); *B65G 2811/0626* (2013.01)

(56) References Cited

FOREIGN PATENT DOCUMENTS

| EP | 2363029 A1 | 9/2011 | |
|---|---|---|---|
| EP | 2335503 B1 * | 5/2014 | ............. A24C 5/327 |
| WO | 03043449 A1 | 5/2003 | |

OTHER PUBLICATIONS

Written Opinion of the International Searching Authority for corresponding application PCT/GB2019/050253 filed Jan. 30, 2019; Mail date May 20, 2019.
Korean Office Action for corresponding application 10-2020-7022006; Report dated Jul. 12, 2022.
Korean Office Action for corresponding application 10-2020-7022006; Report dated Jan. 31, 2023.
Korean Office Action for Application No. 10-2023-7028204, dated Oct. 8, 2024, 12 pages, English translation.

* cited by examiner

SEPARATOR DRUM

TECHNICAL FIELD

The present invention relates to a separator drum for tobacco industry product assembly apparatus.

BACKGROUND

Apparatus for making cigarettes typically receives a wrapped tobacco rod, cuts the tobacco rod into two parts, spaces apart the cut tobacco rods, positions a double-length filter between the spaced tobacco rods, and then joins the cut tobacco rods to the filter using a wrapper. This assembly is then cut through the filter to form two cigarettes. A separator drum is part of the apparatus for making cigarettes and is positioned to receive cut tobacco rods. The separator drum moves the cut tobacco rods axially apart from each other to create a space for the filter.

SUMMARY

In accordance with embodiments of the invention, there is provided a separator drum for tobacco industry product assembly apparatus, the separator drum comprising a plurality of segments arranged to form at least a part of a peripheral surface of the separator drum, wherein each segment comprises at least one flute and at most four flutes, each flute being adapted to carry a rod of aerosolisable material as the separator drum rotates during use, and wherein each segment is slidably mounted to the separator drum for axial movement.

In one example, each segment comprises only two flutes.

The separator drum may further comprise a cam disposed within the separator drum, and each segment may comprise a cam follower arranged to engage the cam. The cam may be configured to move the segments in an axial direction as the separator drum rotates during use.

Each segment may comprise a first linear bearing disposed on a first side of the segment, and second and third linear bearings disposed on a second side of the segment.

The first linear bearing may be axially offset from the second and third linear bearings. The separator drum may further comprise a plurality of slide rails extending axially on the separator drum. The first linear bearing of a first segment and the second and third linear bearings of a second segment may be received on a single slide rail for axial movement. In this example, the first linear bearing may be spaced from the second and third linear bearings on the slide rail to permit independent axial movement of the first segment and the second segment along the slide rail.

The plurality of segments may be arranged in first and second rows extending about the circumference of the separator drum. Each segment in the first row of segments may be aligned with a segment in the second row of segments in an axial direction.

The separator drum may comprise at least five segments in each row of segments. Alternatively, the separator drum may comprise only ten segments in each row of segments. Each row of segments may comprise twenty flutes.

The separator drum may further comprise a cam disposed within the separator drum, each segment may comprise a cam follower arranged to engage the cam, and the cam may be configured to move the segments in an axial direction as the separator drum rotates during use.

The cam may be configured to move the segments of the first row of segments in an axial direction as the separator drum rotates. The cam may be configured to move the second row of segments in addition to the first row of segments.

The cam may be configured to move each segment of the first row of segments between a first position in which the segment is proximate to an adjacent segment of the second row of segments, and a second position in which the segment is axially spaced from the adjacent segment of the second row of segments.

In the first position the segments may be in contact with each other. The axial distance between the first and second positions of each segment may be at least 70 millimetres.

The cam may be configured to move the segments from the first position to the second position within 35 degrees of rotation of the separator drum. The cam may be configured to move the segments from the second position to the first position within 35 degrees of rotation of the separator drum.

The cam may be configured such that in one full rotation of the separator drum the cam moves the segments from the first position, to the second position, and back to the first position.

Each flute may comprise at least one suction hole for retaining said rod of aerosolisable material.

According to a further aspect of the present invention, there is also provided apparatus for assembling tobacco industry products, comprising the separator drum described above.

The apparatus may further comprise a cutting drum disposed upstream of the separator drum. The cutting drum may be adapted to cut a rod of aerosolisable material into two parts prior to the cut rods of aerosolisable material being transferred into the separator drum.

The apparatus may further comprise an assembly drum disposed downstream of the separator drum to receive spaced cut rods of aerosolisable material from the separator drum.

The assembly drum may be further configured to receive filter elements, one filter element being received between spaced rods of aerosolisable material on the assembly drum.

The apparatus may further comprise apparatus for wrapping a joining wrapper at least partially about the filters and rods of aerosolisable material to form tobacco industry products.

DETAILED DESCRIPTION

Figure 1:
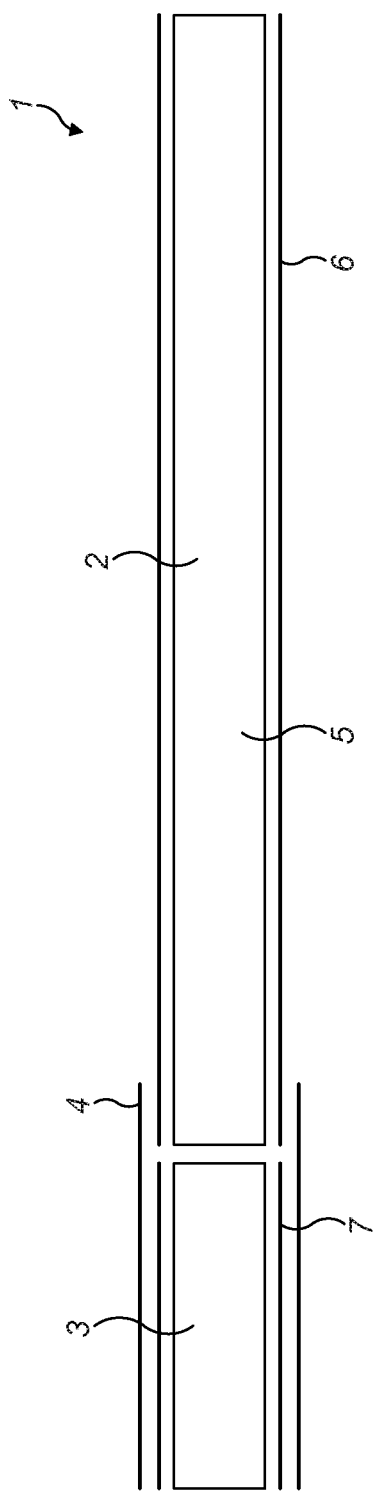
FIG. 1 is a schematic drawing of a tobacco industry product.

During assembly of tobacco industry products, for example cigarettes, filters are attached to the ends of rods of aerosolisable material to form tobacco industry products. In particular, as illustrated in FIG. 1, a tobacco industry product 1 includes a rod 2 of aerosolisable material, a filter 3, and a joining wrapper 4. FIG. 1 schematically illustrates the tobacco industry product 1, and the thickness of the components and the gaps between them are exaggerated for the purpose of clarity.

In the examples described below, the rod of aerosolisable material is a tobacco rod 2, containing a tobacco material. However, it will be appreciated that the rod of aerosolisable material may comprise an alternative aerosolisable material, for example a non-tobacco material, as explained further hereinafter.

The tobacco rod 2 includes tobacco material 5 and a tobacco rod wrapper 6 that is wrapped about the tobacco material 5. The tobacco rod wrapper 6 is typically made of paper and adhesive is provided along a lap seam to secure the tobacco rod wrapper 6 about the tobacco material 5.

The filter 3 may have one or more filter components, and may have a wrapper 7 (e.g. a plug wrap) wrapped about the one or more filter components. The wrapper 7 is typically made of paper. In various examples, the filter 3 may include a cellulose acetate segment, a hollow tubular segment, a capsule segment, an additive segment, or other segments that are known in the art of tobacco industry products. The filter 3 may include segments made of paper, plastics or other materials.

In one particular example, the filter 3 comprises a single segment of cellulose acetate. In another example, the filter comprises a cellulose acetate segment, and a tubular segment. The tubular segment may be made of cellulose acetate, or it may be made of paper, for example layers of paper rolled into a tube. In another example, the filter 3 may comprise a cellulose acetate segment, a plastic segment, for example extruded plastic (e.g. acetate), and a tubular mouth end segment (e.g. cellulose acetate tube or paper tube).

Such filters 3 can have a length in excess of 36 millimetres. For example, the filter 3 may have a length of between 36 millimetres and 45 millimetres, or between 40 millimetres and 43 millimetres.

The joining wrapper 4 is typically made of paper and is wrapped about the abutment between the filter 3 and the tobacco rod 2 to join them together. As illustrated in FIG. 1, the joining wrapper 4 may enwrap the entire filter 3 and partially overlap the tobacco rod 2. The joining wrapper 4 is provided with a lap seam that adheres the joining wrapper 4 to itself to hold the joining wrapper 4 in position. The joining wrapper 4 may also be adhered directly onto the underlying filter 3 and tobacco rod 2.

As will be known by a person skilled in the art of manufacturing tobacco industry products, during manufacture of tobacco industry products a continuous tobacco rod is formed by moving tobacco material and the tobacco rod wrapper in an axial direction through a garniture that wraps the tobacco rod wrapper about the tobacco material. The continuous tobacco rod is then severed into lengths before being transferred to a tobacco industry product assembly machine. On the tobacco industry product assembly machine the lengths of tobacco rod move sideways, i.e. in a direction perpendicular to their axial lengths. The tobacco industry product assembly machine assembles filters 3, lengths of tobacco rod 2 and joining wrappers 4 to form tobacco industry products 1, such as the example shown in FIG. 1.

Figure 3:
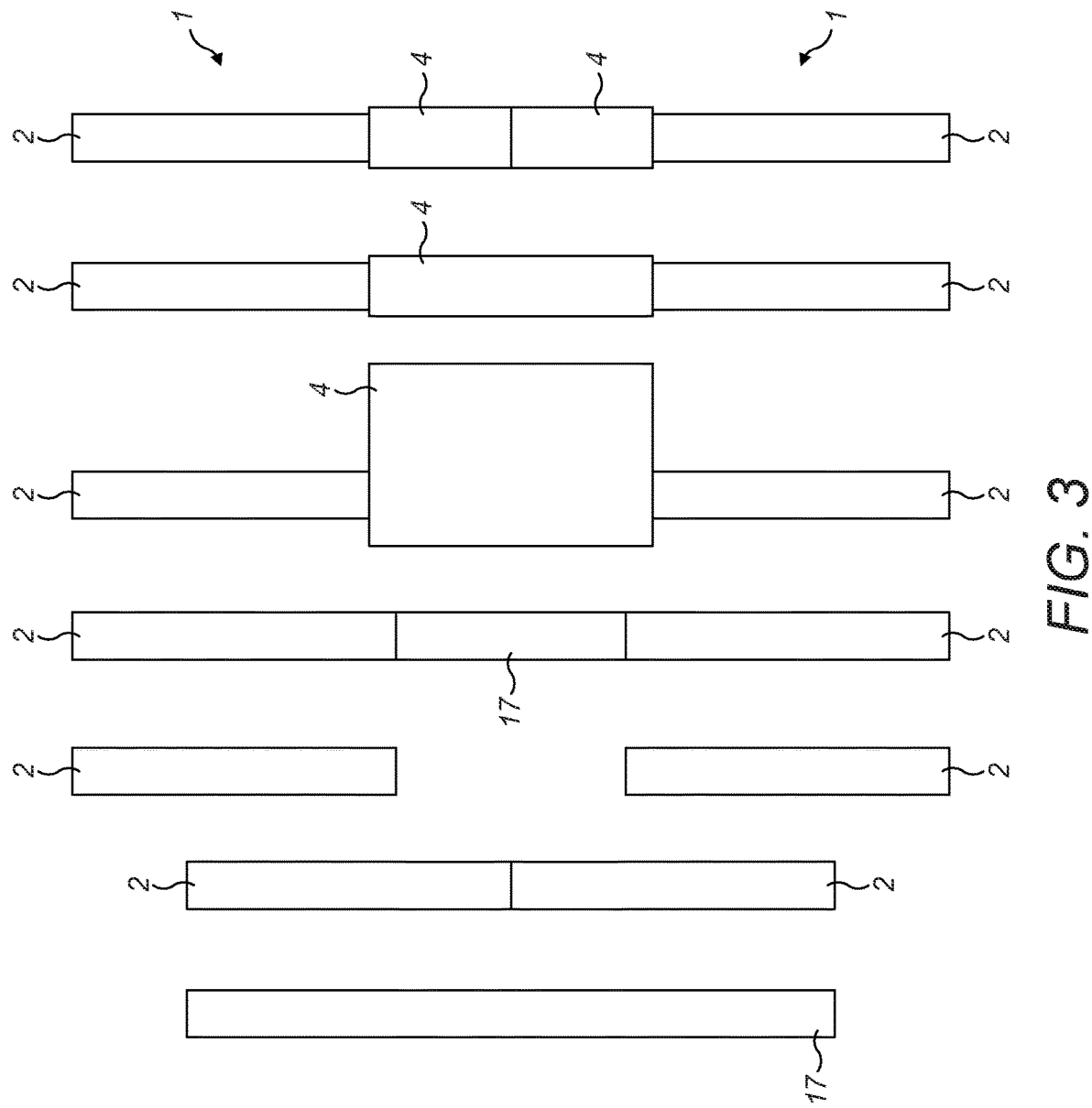
FIG. 3 is a schematic diagram of a process of assembling the tobacco industry product of FIG. 1.

A tobacco industry product assembly machine may perform 'two-up' manufacture of tobacco industry products 1, as illustrated in FIG. 3, or alternatively a tobacco industry product assembly machine may perform a 'four-up' or 'six-up' process. As explained with reference to FIG. 3, during the tobacco industry product assembly process lengths of tobacco rod are cut and spaced apart before a double-length filter is positioned between the cut tobacco rods. This arrangement is then wrapped by the joining wrapper to form two tobacco industry products in back-to-back arrangement, and then the double length filter is cut through to form separate tobacco industry products.

Figure 2:
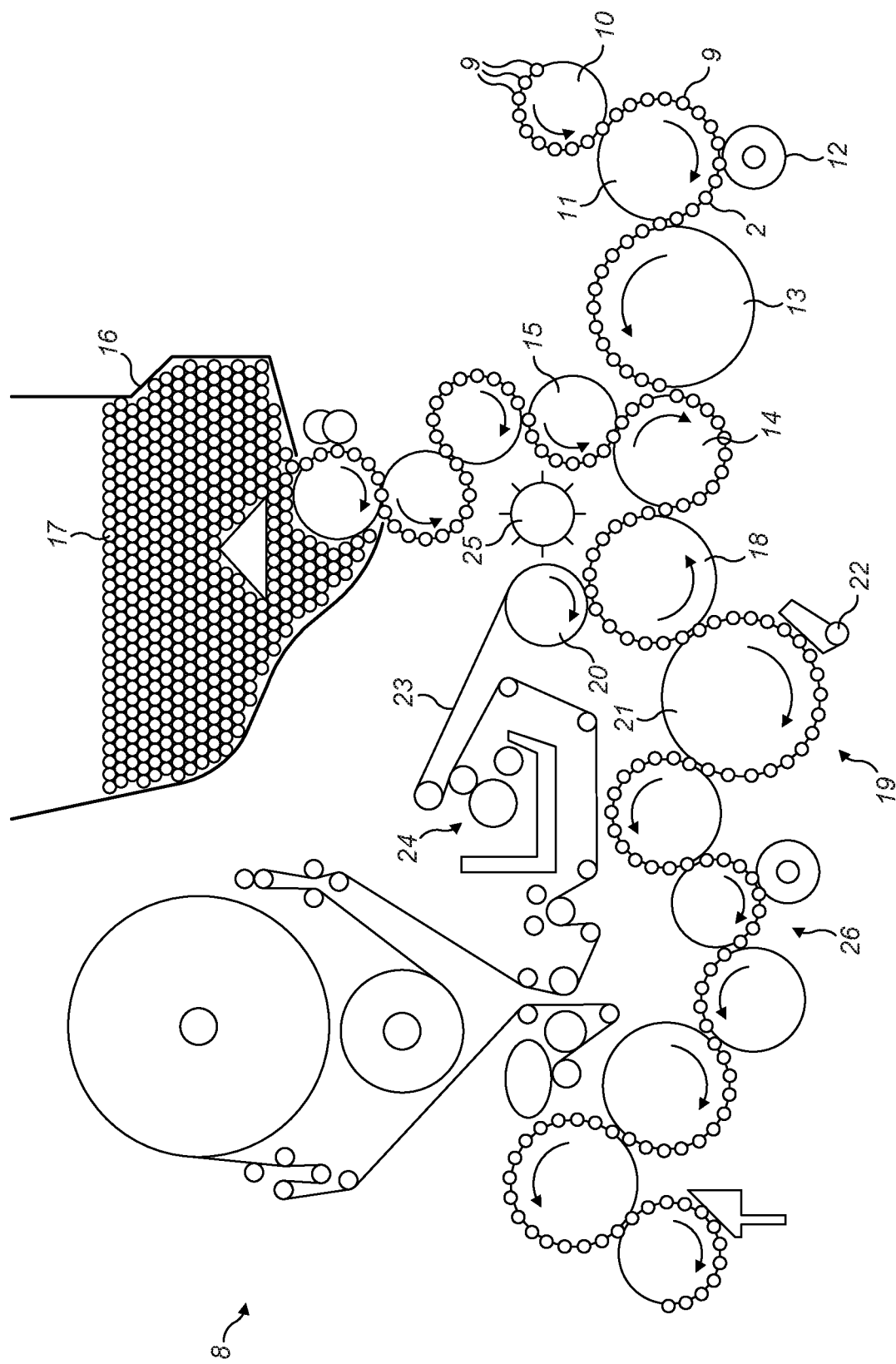
FIG. 2 shows apparatus for assembling the tobacco industry product of FIG. 1.

A tobacco industry product assembly machine 8 is schematically illustrated in FIG. 2. Wrapped tobacco rods are formed in a tobacco rod manufacturing machine, with which the skilled person will be familiar. At output from the tobacco rod manufacturing machine lengths of tobacco rod 9 are transferred into the tobacco industry product assembly machine 8. In a 'two-up' process the lengths of tobacco rod 9 that are transferred into the tobacco industry product assembly machine 8 have a length which is two times the length of the tobacco rod 2 in the final tobacco industry product 1, illustrated in FIG. 1.

The tobacco industry product assembly machine 8 comprises several drums arranged to convey the components and tobacco industry products in a direction transverse to their length (i.e. sideways). The drums generally include a plurality of flutes (i.e. grooves) formed on their peripheral surfaces. The flutes are provided with suction holes configured to retain the components or tobacco industry products in the flutes for the desired portion of the rotation of the drum. Components or tobacco industry products are transferred from one drum to another at the point where the drums are closest to each other.

As used herein, the term 'upstream' means in a direction towards the start of the process where components are fed onto the apparatus, and the term 'downstream' means in a direction towards the end of the process where formed tobacco industry products are output.

Referring to FIGS. 2 and 3, the tobacco industry product assembly machine 8 includes a tobacco rod feed drum 10 that receives wrapped tobacco rods 9 from the tobacco industry product assembly machine. The tobacco rods 9 are travelling in a direction transverse to their length (i.e. sideways) in flutes formed in the peripheral surface of the tobacco rod feed drum 10. The double-length tobacco rods 9 are then transferred to a cutting drum 11, and a cutter 12 cuts the double-length tobacco rods 9 in half on the cutting drum 11 to form two tobacco rods 2 of the appropriate length for the eventual tobacco industry products 1 (see FIG. 1).

As illustrated, the cutter may be a rotary disk 12 located adjacent the cutting drum 11 so that the rotary disk 12 cuts the tobacco rods 9 as they are carried about the peripheral surface of the cutting drum 11. The rotary disk 12 may be driven to rotate. The cutting drum 11 may include an edge extending about the circumference of the cutting drum 11 and arranged to act as an anvil for the rotary disk 12.

After the tobacco rods 2 are cut on the cutting drum 11 they are transferred to a separator drum 13. The separator drum 13 moves the cut tobacco rods 2 axially apart to create a space between the cut ends of the tobacco rods 2, as illustrated in FIG. 3. After the cut tobacco rods 2 have been axially spaced they are transferred to an assembly drum 14.

A filter feed drum 15 receives filters 17 from a hopper 16 and positions the filters 17 onto the assembly drum 14. The filters 17 that are fed onto assembly drum 14 are double-length, that is, twice the length of the filter 3 in the eventual tobacco industry product 1 (see FIG. 1). If the filters 3 include more than one component, then the components within the filters 17 fed onto the assembly drum 14 are symmetrically arranged about a centre line. In examples, the double-length filters 17 may have a length greater than 72 millimetres, for example between 72 millimetres and 90 millimetres. In examples, the double-length filters 17 have a length of between 80 millimetres and 86 millimetres. In one example, the double-length filter 17 has a length of 86 millimetres.

As shown in FIG. 2, the assembly drum 14 rotates in an opposite direction to the separator drum 13 and receives the filters 17 before the tobacco rods 2 are positioned either side of the filters 17, so that a filter 17 is located between the spaced apart tobacco rods 2. It will be appreciated that the tobacco rods 2 may alternatively be placed on the assembly drum 14 prior to the filters 17.

The assembly drum 14 may include a swash plate (not shown) that pushes the tobacco rods 2 and double-length filter 17 together so that one end of each tobacco rod 2 abuts an end of the filter 17. The tobacco rods 2 and filter 17 are then transferred from the assembly drum 14 onto a wrapper drum 18 where a joining wrapper 4 is added to each filter 17 and pair of tobacco rods 2. This assembly is then transferred to a rolling unit 19 that rolls the joining wrapper 4 around the tobacco rods 2 and the double-length filter 17 to form two assembled tobacco industry products 1 in back-to-back arrangement, as shown in FIG. 3.

The joining wrappers 4 are supplied to the wrapper drum 18 by a suction drum 20 that provides cut patches of paper with adhesive already applied. The rolling unit 19 rolls the assembly between a circumferential surface of a rolling drum 21 and a stationary roll hand 22 such that the joining wrapper 4 is wrapped about the double-length filter 17 and the ends of the tobacco rods 2, joining them together.

As illustrated, a web of paper 23 passes through an adhesive applicator 24 that applies adhesive to one surface of the paper web 23. The paper web 23 is then received on the suction drum 20, which uses suction to hold the web of paper 23 against the peripheral surface of the suction drum 20. A cutting unit 25 cuts the web of paper 23 into patches on the suction drum 20 and the patches are then transferred to the tobacco rods 2 and double-length filters 17 on the wrapper drum 18. Each patch of paper thereby forms a joining wrapper 4.

The joining wrappers 4 on the suction drum 20 already have adhesive applied to their outwards facing surface, which anchors the joining wrappers 4 to the tobacco rods 2 and filters 17 on the wrapper drum 18.

The tobacco rods 2, filters 17, and joining wrappers 4 are then transferred into the rolling unit 19 that rolls the joining wrapper 4 around the tobacco rods 2 and double-length filter 17 to form tobacco industry products 1. The rolled tobacco industry products 1 are then severed through the middle of the double-length filters 17 at cutting drum 26 to form two separate tobacco industry products 1, which are then conveyed through further drums for packaging.

As explained with reference to FIGS. 2 and 3, the tobacco industry product assembly machine 8 includes a separator drum 13 that receives two cut tobacco rods 2 in end-to-end abutment, and moves them axially apart to create a space in between the cut tobacco rods 2 for the double-length filter 17 to be positioned on the assembly drum 14.

In some examples, the separation between the cut tobacco rods 2 may be greater than 70 millimetres to provide for a 35 millimetre filter on each tobacco industry product. For example, the separator drum 13 may be arranged to separate the cut tobacco rods 2 by a distance of greater than 75 millimetres, or greater than 80 millimetres, or greater than 90 millimetres. In one specific example, the separator drum 13 is arranged to separate the cut tobacco rods 2 by a distance of up to 90 millimetres, to accommodate a double length filter having a length of 86 millimetres.

Figure 4:
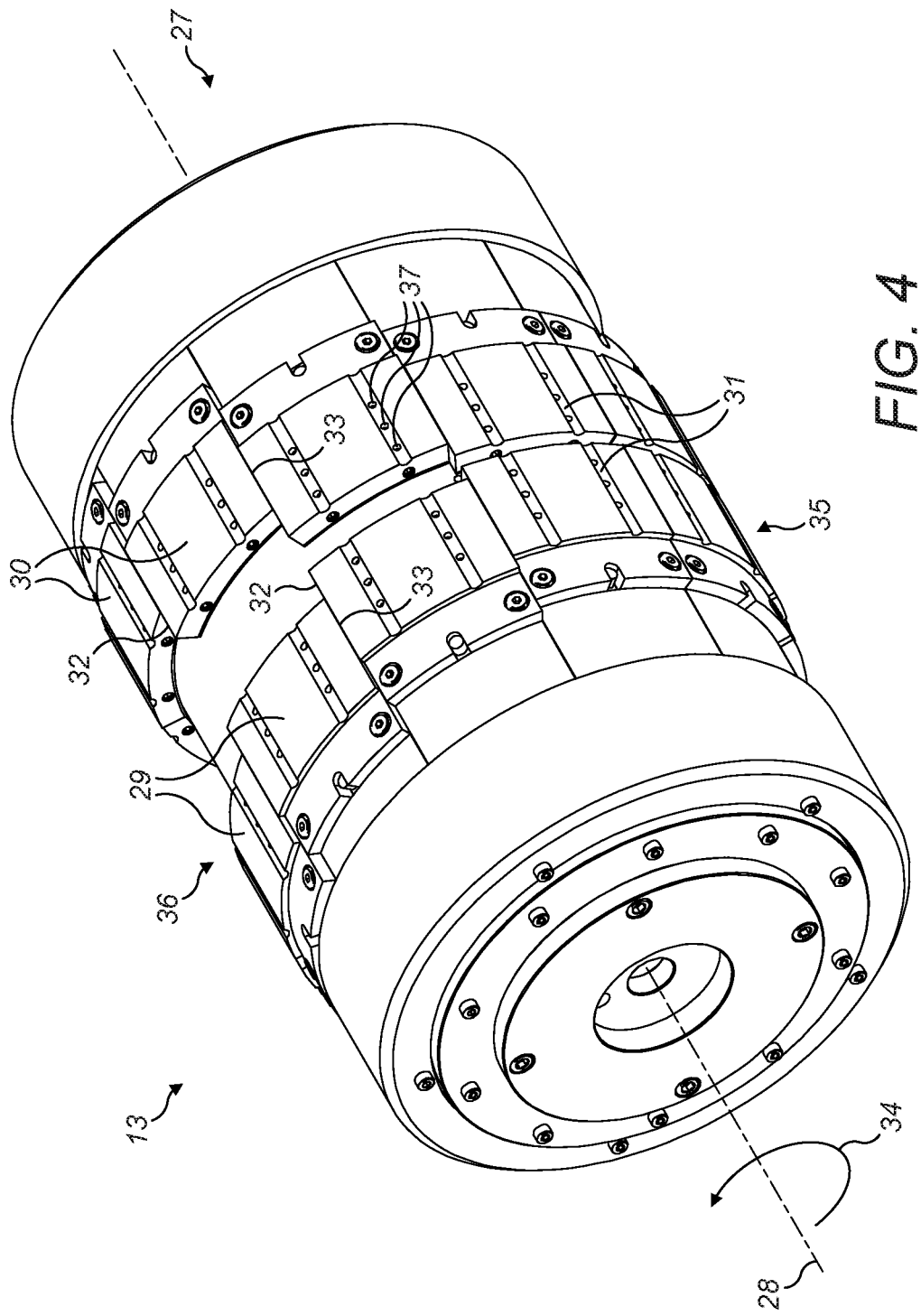
FIG. 4 shows a separator drum of the apparatus for assembling a tobacco industry product of FIG. 2.

FIG. 4 illustrates the separator drum 13. The separator drum 13 includes a generally cylindrical hub 27 that rotates about an axis 28, and a plurality of segments 29, 30 that form a part of the peripheral surface of the hub 27. The segments 29, 30 are arranged circumferentially about the hub 27 in two rows. Each segment 29 is aligned with a segment 30 of the other row in the axial direction to form a pair of segments 29, 30. Each pair of segments includes a first segment 29 and a second segment 30.

Each segment 29, 30 includes at least one, in this example two, flutes 31. The flutes 31 in the first segments 29 are aligned to the flutes 31 in the second segments 30. In this way, a pair of cut tobacco rods (2, see FIG. 3) that are received from the cutting drum (ii, see FIG. 2) in axial alignment can be held on a pair of first and second segments 29, 30. Each segment 29, 30 has a leading edge 32 and a trailing edge 33. During rotation of the hub 27 in the direction of arrow 34, the leading edges 32 are at the front of the segments 29, 30, and the trailing edges 33 are at the rear of the segments 29, 30.

As shown, the segments 29, 30 are slidably mounted to the hub 27. During rotation of the hub 27 in the direction of arrow 34 the segments 29, 30 move between a first position (indicated at 35) where they are axially proximate to each other or in contact with each other, and a second position (indicated at 36) in which the segments 29, 30 have both moved axially away from each other to create a space in between. In the first position 35 the segments 29, 30 may be abutting, or they may be spaced apart by a small distance.

In this way, axial movement of the segments 29, 30 during rotation of the hub 27 moves the cut tobacco rods (2, see FIG. 3) apart to create a space between the cut ends of the tobacco rods. The tobacco rods are then transferred to the assembly drum (14, see FIG. 2) in their spaced arrangement, and filters 7 are positioned between the cut tobacco rods, as previously explained with reference to FIG. 2.

As mentioned above, each segment 29, 30 of the separator drum 13 includes at least one flute 31. In the illustrated examples each segment 29, 30 has two flutes 31. In other examples, each segment 29, 30 may have up to four flutes 31. For example, each segment 29, 30 may have three flutes 31. Each segment 29, 30 has no more than four flutes 31.

The flutes 31 of the segments 29, 30 are provided with suction holes 37 to which suction is applied to hold the cut tobacco rods 2 in the flutes 31 on the segments 29, 30. Suction is applied to the suction holes 37 via one or more suction control rings 41, 42 located within the separator drum 13 that is configured to provide suction for only a part of the rotation of the separator drum 13, as explained below.

Figure 5:
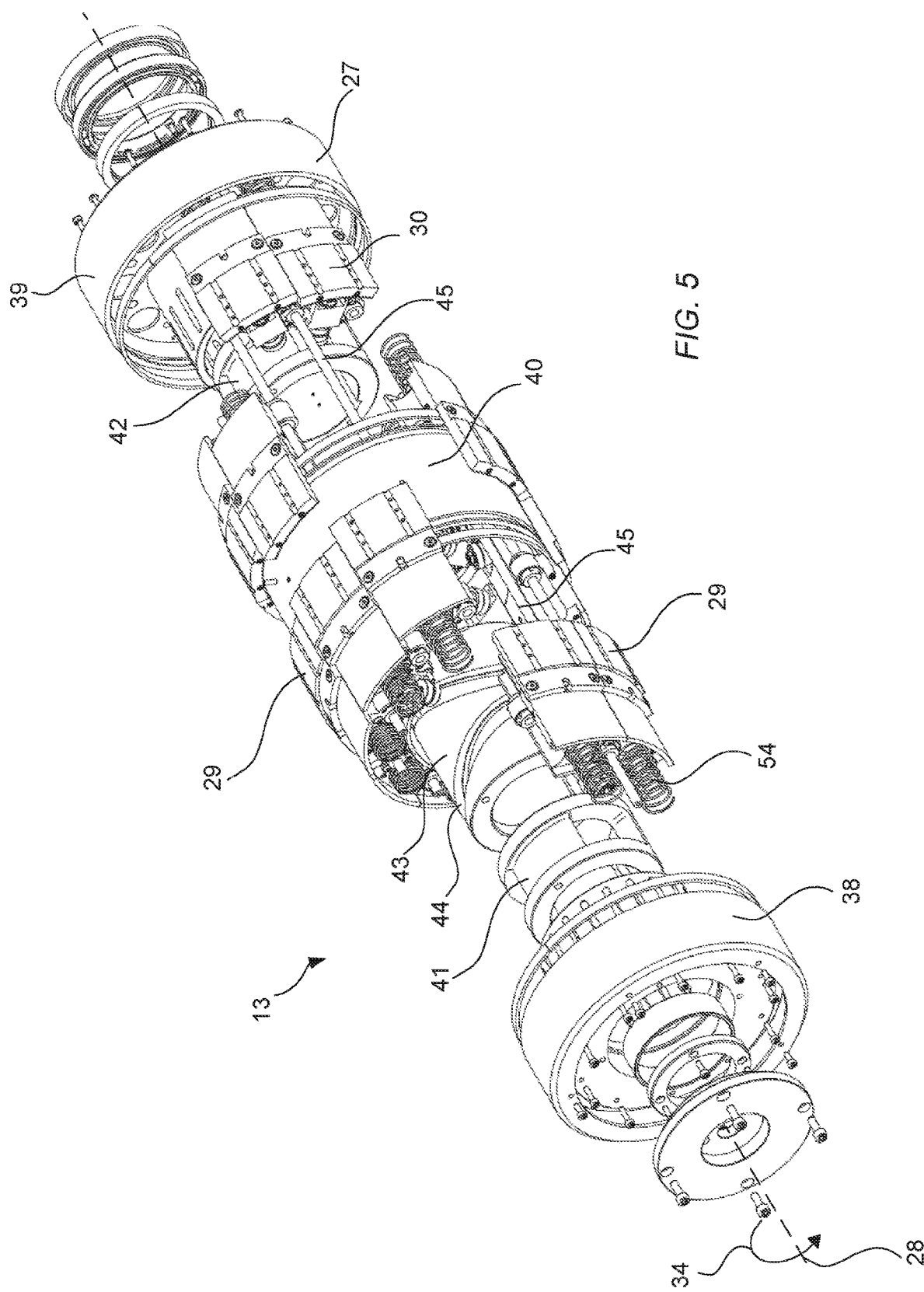
FIG. 5 shows an exploded view of the separator drum of FIG. 4.

FIG. 5 shows an exploded schematic view of the separator drum 13. As shown the separator drum 13 includes a hub 27, to which a plurality of segments 29, 30 are mounted. A cam 43 is disposed within the hub 27 and is arranged to move the segments 29, 30 axially as the hub 27 rotates relative to the cam 43.

The hub 27 comprises two end rings 38, 39, a plurality of segments 29, 30, and a shield 40. Rotary bearings are located within the hub 27, along with the cam 43 that includes a cam track 44. The end rings 38, 39 are located at the axial ends of the hub 27 and are rotatably mounted on the rotary bearings. The segments 29, 30 and the shield 40 are movably attached to the end rings 38, 39 and rotate on the rotary bearings together with the end rings 38, 39. The mountings of the rotary bearings and the cam 43 are fixed to the machine, for example on a mounting shaft (not illustrated). In this way, the end rings 38, 39, together with the segments 29, 30, rotate relative to the cam 43. In addition, the hub 27 includes a plurality of slide rails 45 extending axially between the end rings 28, 39. The slide rails 45 may be fixed to the end rings 38, 39 and/or to the shield 40. The segments 29, 30 are adapted to slide on the slide rails 45 as they move back and forth in the axial direction on the hub 27.

FIG. 5 also illustrates the suction control rings 41, 42 that are arranged to provide suction to the suction holes 37 during a part of the rotation of the separator drum 13, in particular the part of rotation when the flutes 31 are carrying tobacco rods 2.

Figure 6:
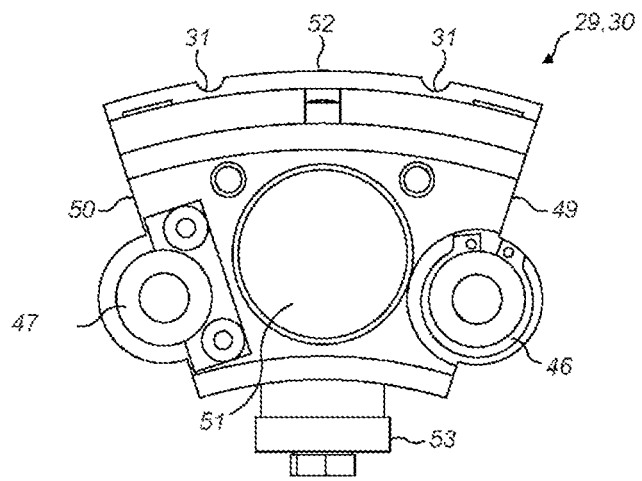
FIG. 6 shows an end view of a segment of the separator drum of FIGS. 4 and 5.
Figure 7:
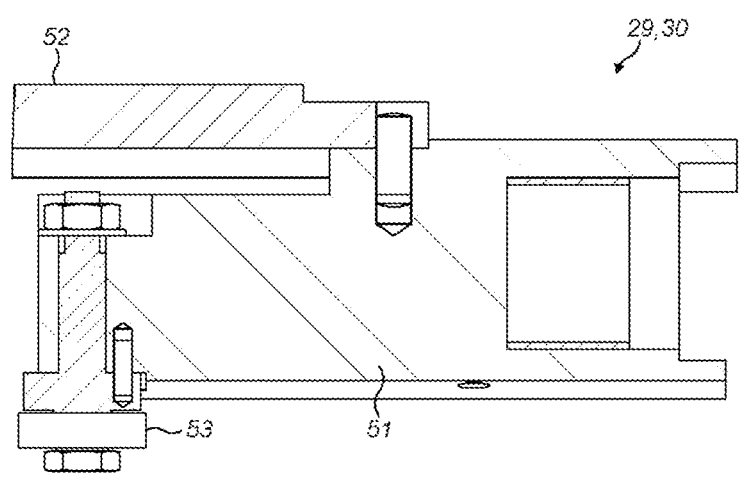
FIG. 7 shows a cross-sectional view of a segment of the separator drum of FIGS. 4 and 5.
Figure 8:
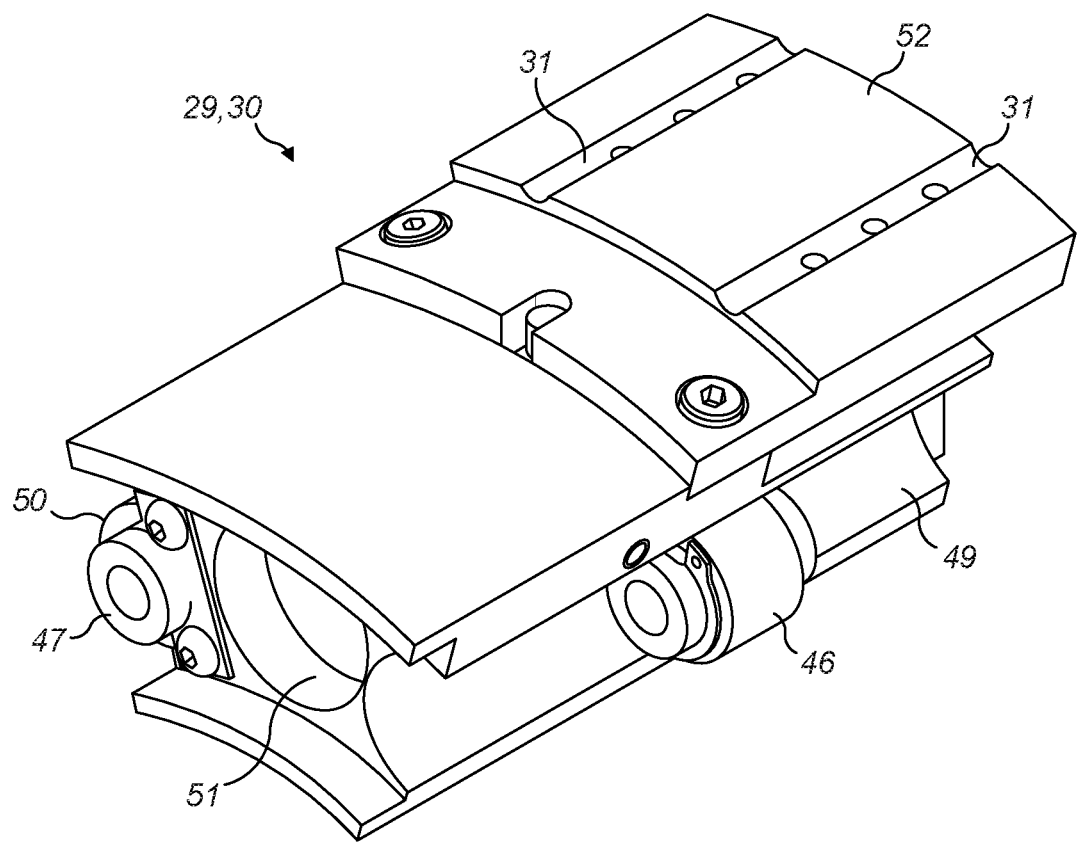
FIG. 8 shows a perspective view of a segment of the separator drum of FIGS. 4 and 5; and, FIG. 9 shows a schematic diagram of the separator drum of FIGS. 4 and 5.

FIGS. 6, 7 and 8 show a first segment 29 of the separator drum 13. It will be appreciated that the second segments 30 are the same, but are arranged oppositely on the separator drum 13.

As shown in FIGS. 6, 7 and 8, each segment 29, 30 has a generally arcuate body 51 and an arcuate peripheral surface 52. The flutes 31 are formed in the peripheral surface 52.

Each segment 29, 30 also comprises linear bearings 46, 47, 48 that cooperate with the slide rails (45, see FIG. 5) to allow the segments 29, 30 to slide axially on the hub 27. A first side 49 of each segment 29, 30 comprises a first linear bearing 46 located centrally on the segment 29, 30 in an axial direction. The second side 50 of each segment 29, 30 comprises second and third linear bearings 47, 48 that are axially spaced from each other along the segment 29, 30. In this way, when the segments 29, 30 are arranged circumferentially about the hub 27, as shown in FIG. 4, the first linear bearing 46 of one segment 29, 30 is disposed between the second and third linear bearings 47, 48 of an adjacent segment 29, 30 in the same row, and on the same slide rail 45. This tessellating arrangement of linear bearings 46, 47, 48 allows each segment 29, 30 to slide along the slide rails 45 independently of the adjacent segments 29, 30 in the same row. This arrangement also brings the segments 29, 30 and the flutes 31 closer together, which saves space and reduces the overall number of linear bearings 46, 47, 48 and slide rails 45 in the separator drum 13.

As illustrated, the peripheral surface 52 portion of each segment 29, 30 may be separable from the body 51, although it will be appreciated that the peripheral surface 52 may alternatively be integral to the body 51.

As also illustrated in FIGS. 6, 7 and 8, each segment 29, 30 includes a cam follower 53 attached to, and extending from, an inner part of the body 51 of the segment 29, 30. The cam follower 53 extends into the interior of the separator drum 13. The cam follower 53 is adapted to engage the cam track (44, see FIG. 5) within the separator drum 13. In this way, rotation of the hub 27, and segments 29, 30, relative to the cam 43 causes the cam followers 53 to move along the cam track 44 and move the segments 29, 30 axially along the linear bearings 45.

The configuration of the cam track 44 defines the axial movement of the segments 29, as the hub 27 rotates. The cam track 44 is configured to move the segments 29, 30 between the first position 35 and the second position 36 illustrated in FIG. 4 as the hub 27 rotates.

Specifically, the cam track 44 is configured to move the segments 29, 30 between a first position (indicated at 35 in FIG. 4) where they are axially proximate to each other or in contact with each other, and a second position (indicated at 36 in FIG. 4) in which the segments 29, 30 have both moved axially away from each other In the first position 35 the segments 29, 30 may be abutting, or they may be spaced apart by a small distance As shown in FIG. 5, a plurality of springs 54 are arranged between the end discs 38, 39 and the segments 29, 30, respectively, to urge the segments 29, 30 axially towards each other—i.e. towards the first position 35 illustrated in FIG. 4. In this way, the cam followers 53 smoothly follow the cam track 44 without any backlash caused at the inflections on the cam track 44.

In an alternative example, the springs are arranged oppositely, so that they urge the segments away from each other, to the same effect.

Operation of the separator drum 13 will be explained with reference to FIGS. 2 and 9. As shown in FIG. 2, the separator drum 13 is arranged to receive the cut tobacco rods 2 from the cutting drum 11 at a first rotational position, illustrated by line 55 in FIG. 9. As the separator drum 13 rotates in the direction of arrow 34 the segments 29, 30 move axially to space apart the cut tobacco rods 2 on segments 29 and 30. The spaced tobacco rods 2 are then transferred to the assembly drum 14 at the rotational position indicated by line 56. At the rotational position of line 55 the segments 29, 30 are in the first position (35, see FIG. 4) to receive the tobacco rods 2 in end-to-end abutment or close proximity. At the rotational position of line 56 the segments 29, 30 are in the second position (36, see FIG. 4), where the tobacco rods 2 are axially spaced from each other and are transferred to the assembly drum 14.

Moving anti-clockwise as illustrated, the cam is configured to move the segments 29, axially apart from each other between the rotational positions of lines 55 and 56 the cam 43, and then axially towards each other between the rotational positions of lines 56 and 55.

Figure 9:
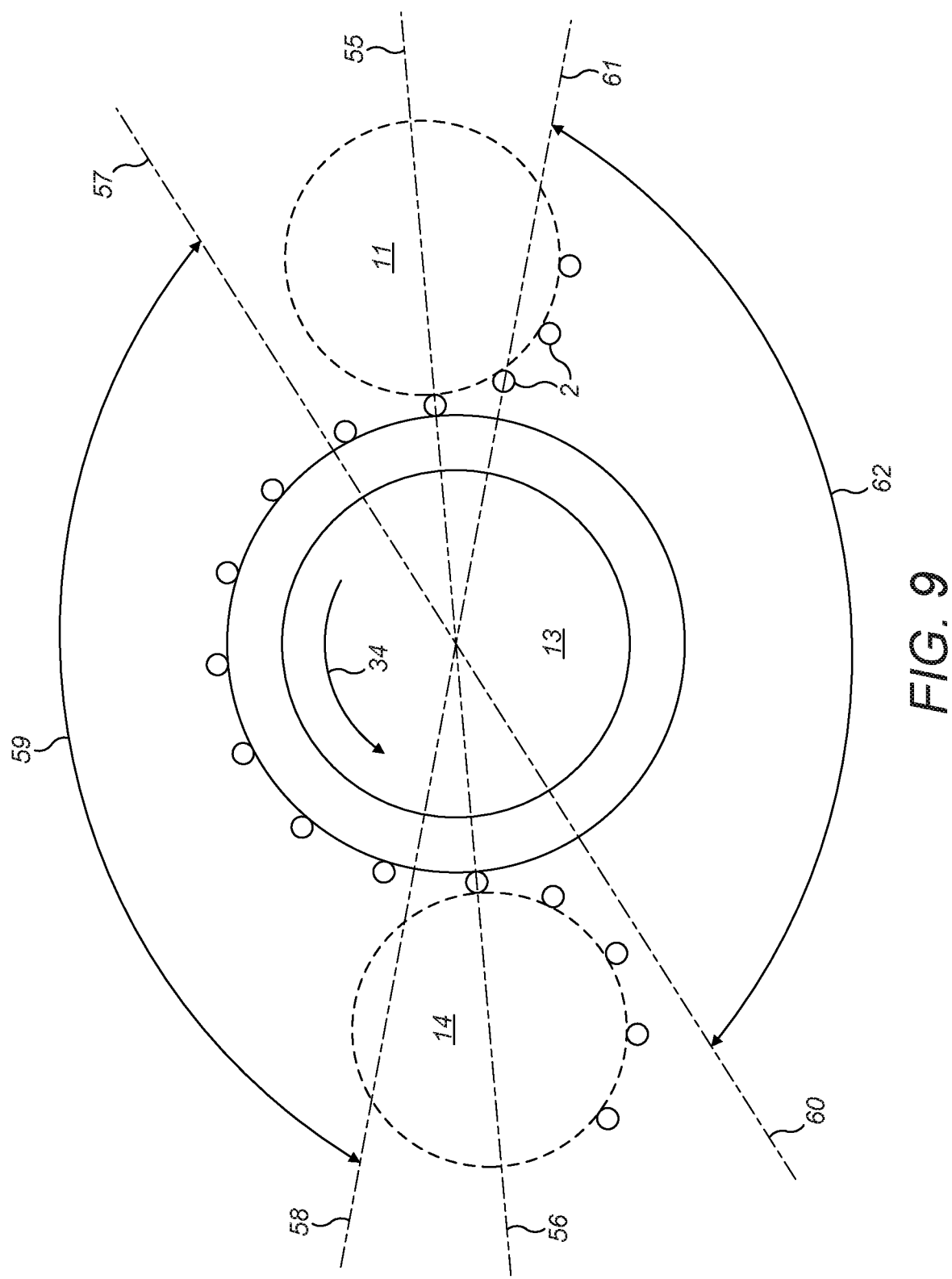

After the rotational position of line 55 at which the segments 29, 30 receive cut tobacco rods 2 the start of the axial movement of the segments 29, 30 is delayed until the rotational position indicated by line 57, as illustrated in FIG. 9. This is because, as shown in FIGS. 4 to 6, each segment 29, 30 has two flutes 31, and so the axial movement of the segments 29, 30 begins only after the second flute 31 has received the cut tobacco rod 2. Similarly, the axial movement of the segments 29, 30 is completed by the rotational position indicated by line 58, which is slightly before the rotational position of line 56 at which the spaced tobacco rods 2 are transferred to the assembly drum 14. Therefore, axial movement of the segments 29, 30 from the first position (35, see FIG. 4) to the second position (36, see FIG. 4) occurs within the rotational segment 59 illustrated in FIG. 9.

In a similar manner to above, after the rotational position of line 56 at which the cut tobacco rods 2 are transferred to the assembly drum 14 the start of the axial movement of the segments 29, 30 towards each other is delayed until the rotational position indicated by line 60. This is so that the tobacco rods 2 of both of the two flutes 31 on each segment 29, 30 have passed the rotational position of line 56 before the segments 29, 30 begin their axial movement. The axial movement of the segments 29, 30 back to the first position (35, see FIG. 4) is completed by the rotational position indicated by line 61, which is slightly before the rotational position of line 55 at which further cut tobacco rods 2 are received in the flutes 31. Therefore, axial movement of the segments 29, 30 from the second position (36, see FIG. 4) to the first position (35, see FIG. 4) occurs within the rotational segment 62 illustrated in FIG. 9.

In some examples, in particular when assembling tobacco industry products 1 having a relatively long filter 3 (e.g. 70 mm or longer, as previously described), a larger spacing is required between the cut tobacco rods 2, i.e. the segments 29, 30 have to travel further in the axial direction when separating the cut tobacco rods 2. This large separation, and the equivalent return movement, is achieved in the rotational segments 59 and 62 on the separator drum 13, as explained above. The rotational segments 59 and 62, in which the axial movements of the segments 29, 30 are completed, may only be about 30 degrees of rotation for a conventional separator drum. It is preferable to increase the angular lengths of the segments 59, 62 as much as possible.

Providing only no more than four flutes 31 per segment 29, 30 increases the available rotational distance to accommodate rotational segments 59, 62 because the rotational positions of lines 57 and 60 can be closer to the rotational positions of lines 55 and 56, respectively, in comparison to a conventional separator drum. In examples, as explained previously, the rotational distance described above may be achieved by providing four flutes 31 per segment 29, 30, three flutes 31 per segment 29, 30, two flutes 31 per segment 29, 30, as illustrated, or even one flute 31 per segment 29, 30. That is, by providing each segment 29, 30 with between one and four flutes 31 the rotational distance for the separation can be increased, allowing greater separation for relatively long filters 3.

This is advantageous if a large spacing is desired between the cut tobacco rods 2, for example for tobacco industry products having a long filter 7, because the acceleration of the segments 29, 30 in their axial movement can be reduced. This reduces the likelihood of tobacco rods 2 falling out of the flutes 31, and reduces overall wear and tear on the separator drum 13.

Moreover, in a preferred example the separator drum 13 includes ten segments 29, 30 per row of segments 29, 30, each having two flutes 31. In this example, the separator drum 13 would comprise twenty flutes 31 per row. In this way, the separator drum 13 is compatible with existing tobacco industry product manufacturing machines that have twenty flutes per row but shared between only four segments (each comprising five flutes)—i.e. it is correctly formatted to receive and release tobacco rods 2 at the correct rotational positions. For example, the separator drum 13 is compatible with 'Hauni Max 80' or 'Hauni Max 90' machines for assembling cigarettes. The skilled person would be familiar with such machines. However, in other examples, the separator drum 13 may have more or less than twenty flutes 31 per row. For example, if each segment 29, 30 had three flutes 31, then the separator drum 13 might have 18 or 21 flutes 31 per row.

Furthermore, the tessellating arrangement of the segments 29, 30, particularly the arrangement of the first, second and third linear bearings 46, 47, 48 that share the linear bearing 45 (as described with reference to FIGS. 6 to 8), means that the circumferential spacing between adjacent segments 29, 30 and flutes 31 is reduced. This increases the length of the rotational segments 59 and 62, allowing more time for the segments 29, 30 to make the axial movement and reducing the acceleration of the segments 29, 30 and the cut tobacco rods 2. This reduces the likelihood of tobacco rods 2 falling out of the flutes 31, and reduces overall wear and tear on the separator drum 13.

As used herein, the term 'aerosolisable material' includes materials that provide volatilised components upon heating, typically in the form of vapour or an aerosol. In some examples, as described above, the aerosolisable material includes a tobacco material. In other examples, the aerosolisable material consists of a tobacco material, or a blend of different tobacco materials. In other examples, the aerosolisable material is free from tobacco material. The apparatus described herein may be used to manufacture a rod of any aerosolisable material.

As used herein, the term "tobacco industry product" is intended to include smoking articles comprising combustible smoking articles such as cigarettes, cigarillos, cigars, tobacco for pipes or for roll-your-own cigarettes, (whether based on tobacco, tobacco derivatives, expanded tobacco, reconstituted tobacco, tobacco substitutes or other smokable material), electronic smoking articles such as e-cigarettes, heating devices that release compounds from substrate materials without burning such as tobacco heating products, hybrid systems to generate aerosol from a combination of substrate materials, for example hybrid systems containing a liquid or gel or solid substrate; and aerosol-free nicotine delivery articles such as lozenges, gums, patches, articles comprising breathable powders and smokeless tobacco products such as snus and snuff.

In one embodiment, the tobacco industry product is a smoking article for combustion, selected from the group consisting of a cigarette, a cigarillo and a cigar.

In one embodiment, the tobacco industry product is a non-combustible smoking article.

In one embodiment the tobacco industry product is a heating device which releases compounds by heating, but not burning, an aerosolisable substrate material. The aerosolisable substrate material may be for example tobacco or other non-tobacco products, which may or may not contain nicotine. In one embodiment the heating device is a tobacco heating device. In one embodiment, the apparatus or method is used to manufacture a consumable for a heating device.

In another embodiment the tobacco industry product is a hybrid system to generate aerosol by heating, but not burning, a combination of aerosolisable substrate materials. The aerosolisable substrate materials may comprise for example solid, liquid or gel which may or may not contain nicotine. In one embodiment, the hybrid system comprises a liquid or gel substrate and a solid substrate. The solid substrate may be for example tobacco or other non-tobacco products, which may or may not contain nicotine. In one embodiment the hybrid system comprises a liquid or gel substrate and tobacco.

In order to address various issues and advance the art, the entirety of this disclosure shows by way of illustration various embodiments in which the claimed invention(s) may be practiced and provide for a superior apparatus for assembling tobacco industry products. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future.

The invention claimed is:

1. A separator drum for tobacco industry product assembly apparatus, the separator drum comprising a plurality of segments arranged in first and second rows extending about the circumference of the separator drum to form at least a part of a peripheral surface of the separator drum, each segment in the first row of segments being aligned with a segment in the second row of segments in an axial direction to form a pair of segments, wherein each segment of the separator drum comprises at least one flute and at most three flutes, and wherein the flutes of each segment are aligned in the axial direction with the flutes of the other segment in each pair of segments, each flute being adapted to carry a rod of aerosolisable material as the separator drum rotates during use, and wherein each segment is slidably mounted to the separator drum for axial movement between a first position in which the segment is proximate to an adjacent segment of the second row of segments, and a second position in which the segment is axially spaced from the adjacent segment of the second row of segments, wherein each segment comprises a first linear bearing disposed on a first side of the segment, and second and third linear bearings disposed on a second side of the segment, and wherein the first linear bearing is axially offset from the second and third linear bearings.

2. The separator drum of claim 1, wherein each segment comprises only two flutes.

3. The separator drum of claim 1, further comprising a cam disposed within the separator drum, each segment comprising a cam follower arranged to engage the cam, and wherein the cam is configured to move the segments in an axial direction as the separator drum rotates during use.

4. The separator drum of claim 1, comprising at least five segments in each row of segments.

5. The separator drum of claim 4, comprising only ten segments in each row of segments.

6. The separator drum of claim 1, wherein each row of segments comprises twenty flutes.

7. The separator drum of claim 1, further comprising a cam disposed within the separator drum, each segment comprising a cam follower arranged to engage the cam, and wherein the cam is configured to move the segments in an axial direction as the separator drum rotates during use, and wherein the cam is configured to move the segments of the first row of segments in an axial direction as the separator drum rotates.

8. The separator drum of claim 7, wherein the cam is configured to move the second row of segments in addition to the first row of segments.

9. The separator drum of claim 7, wherein the cam is configured to move each segment of the first row of segments between the first position and the second position.

10. The separator drum of claim 9, further comprising a plurality of slide rails extending axially on the separator drum, and wherein the first linear bearing of a first segment and the second and third linear bearings of a second segment are received on a single slide rail for axial movement.

11. The separator drum of claim 10, wherein the first linear bearing is spaced from the second and third linear bearings on the slide rail to permit independent axial movement of the first segment and the second segment along the slide rail.

12. The separator drum of claim 9, wherein in the first position the segment is in contact with the adjacent segment of the second row of segments.

13. The separator drum of claim 9, wherein the cam is configured to move the segments from the first position to the second position within 35 degrees of rotation of the separator drum.

14. The separator drum of claim 9, wherein the cam is configured to move the segments from the second position to the first position within 35 degrees of rotation of the separator drum.

15. The separator drum of claim 9, wherein the cam is configured such that in one full rotation of the separator drum the cam moves the segments from the first position, to the second position, and back to the first position.

16. The separator drum of claim 1, wherein each flute comprises at least one suction hole for retaining said rod of aerosolisable material.

* * * * *